US011993490B2

(12) United States Patent
Weibel

(10) Patent No.: US 11,993,490 B2
(45) Date of Patent: May 28, 2024

(54) RAIL-FASTENING SYSTEM

(71) Applicant: Inventio AG, Hergiswil (CH)

(72) Inventor: André Weibel, Ballwil (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/999,951

(22) PCT Filed: Jun. 1, 2021

(86) PCT No.: PCT/EP2021/064633
§ 371 (c)(1),
(2) Date: Nov. 28, 2022

(87) PCT Pub. No.: WO2021/245062
PCT Pub. Date: Dec. 9, 2021

(65) Prior Publication Data
US 2023/0202801 A1 Jun. 29, 2023

(30) Foreign Application Priority Data
Jun. 5, 2020 (EP) .................................... 20178561

(51) Int. Cl.
*B66B 7/02* (2006.01)

(52) U.S. Cl.
CPC .................................. *B66B 7/024* (2013.01)

(58) Field of Classification Search
CPC ...................................................... B66B 7/024
See application file for complete search history.

(56) References Cited

U.S. PATENT DOCUMENTS 3,948,358 A * 4/1976 Atkey ........................ B66B 7/02
187/408
6,196,356 B1 3/2001 Sneed
2007/0084672 A1 4/2007 Helmle et al.
2021/0053797 A1* 2/2021 Rocher ..................... B66B 7/04

FOREIGN PATENT DOCUMENTS

EP 2749518 A1 7/2014
JP 06239559 A * 8/1994 ............. B66B 7/024

OTHER PUBLICATIONS

Schindler Group, MM GRS 700 TICO Guide rail system, catalog, May 18, 2019, pp. 1-70, EJ 41381879_11, Inventio AG, Hergiswil, Switzerland.

* cited by examiner

*Primary Examiner* — Minh Truong
(74) *Attorney, Agent, or Firm* — William J. Clemens; Shumaker, Loop & Kendrick, LLP

(57) ABSTRACT

A rail fastening system fastens a rail of a vertically movable elevator system car has a first clamp connected to a holding structure, and a second clamp connected to the rail. The first clamp has a laterally extending first central part connectable to the holding structure and the second clamp has a laterally extending second central part connectable to the rail. Each clamp has two tabs attached in the lateral direction at opposite ends of the respective central part. A first tab of the first clamp can be connected to one of tabs of the second clamp on a first contact surface, and a second tab of the first clamp can be connected to the other of the tabs of the second clamp on a second contact surface. A first plane runs through the first contact surface and intersects with a second plane that runs through the second contact surface.

16 Claims, 7 Drawing Sheets

RAIL-FASTENING SYSTEM

FIELD

The present invention relates to a rail fastening system, a rail system and a method for fastening a rail.

BACKGROUND

In an elevator system, an elevator car and usually also a counterweight are transferred vertically along a travel path between different floors or levels within a building. More generally, elevator cars and counterweights are also referred to as traveling bodies. The traveling bodies of an elevator system are typically guided by rails. For this purpose, the rails are fastened to a holding structure that is located along the travel path. Such a holding structure is usually a wall of the elevator shaft. However, it can also be a framework structure, for example. The rails should optimally guide the traveling bodies. The optimal guidance is characterized by low-vibration travel of the car and by the absorption of the forces arising during operation. Since the holding structure typically does not run vertically with sufficient precision and exhibits unevenness, it is advantageous that the rail fastening elements can adapt to a required distance between the holding structure and the rail. The application EP2749518 A1 shows a rail fastening system that can be adapted to the required distances in a wide spectrum. For this purpose, the rail fastening system is divided into a first and a second clamp. The second clamp can be fastened in two configurations, each of which allows a different range of distances. By turning the second clamp, a change is made from a first to a second configuration. However, this rail fastening system has the disadvantage that the turning, that is to say a rotation by 180°, of the second securing element is extremely involved during the assembly process.

SUMMARY

An object of the invention can be seen in providing a rail fastening system that can be installed more easily and more quickly.

According to a first aspect of the invention, a rail fastening system achieves the object. The rail fastening system is suitable for fastening a rail of a vertically movable car of an elevator system. The rail fastening system has a first clamp that can be connected to a holding structure, and it has a second clamp that can be connected to the rail. The first clamp has a laterally extending first central part that is designed to be connectable to the holding structure. The second clamp has a laterally extending second central part that is designed to be connectable to the rail. Both clamps each have a first and a second tab which are attached in the lateral direction at opposite ends of the respective central part. The rail fastening system can be assembled in two alternative configurations.

With the first configuration, the first tab of the first clamp is connected to the first tab of the second clamp at a first contact surface, and the second tab of the first clamp is connected to the second tab of the second clamp at a second contact surface.

Alternatively, with the second configuration, the first tab of the first clamp is connected to the second tab of the second clamp at a first contact surface, and the second tab of the first clamp is connected to the first tab of the second clamp at a second contact surface.

A first plane which runs substantially parallel through the first contact surface, and a second plane which runs substantially parallel through the second contact surface, intersect in an intersecting line, and such intersecting line is perpendicular to a flat surface that extends substantially parallel to the second central part.

According to a second aspect of the invention, a rail system for an elevator system achieves the object. The rail system comprises a rail fastening system according to the first aspect of the invention and a rail for guiding a car of the elevator system.

According to a third aspect of the invention, a method for fastening a rail of an elevator system achieves the object. The method comprises the following steps:

- fastening a first clamp according to a rail fastening system corresponding to the first aspect of the invention to a holding structure,
- placing a second clamp according to a rail fastening system corresponding to the first aspect of the invention onto the first clamp,
- fastening a rail to the second clamp, and
- fastening the first clamp to the second clamp.

Possible features and advantages of embodiments of the invention can be considered, inter alia and without limiting the invention, to be based upon the concepts and findings described below.

The holding structure of an elevator describes a structure on which at least some components of the elevator are fastened and which extend over at least a partial region of the travel path of the car. The holding structure is usually designed in the form of a shaft wall. The holding structure can also be designed as a framework structure. Such framework structures are frequently made of metal. The framework structure can also be arranged in the interior of an elevator shaft, for example, or extend along a facade of a building.

The rail fastening system fastens the rail of a vertically movable car of an elevator system. In this case, the rail fastening system defines at least the position of the rail relative to the holding structure, in particular in a horizontal plane in the region of the rail fastening system. It therefore prevents the rail from being able to move horizontally. The rail fastening system can absorb part of the vertical weight force of the rail. Typically, the rail is also located on the bottom of the shaft floor or on a suitable stand in such a manner that the majority of the weight force is introduced into the shaft floor. Since the car is preferably designed to move vertically, the rail, and in particular the extension direction of the rail, is also oriented vertically.

The intersecting line runs perpendicular to the rail that is held on the rail fastening system.

The first clamp and the second clamp touch one another at the tabs at two contact surfaces. Typically, the guide forces are transmitted by means of a frictional connection to these contact surfaces. These contact surfaces are substantially planar. The contact surface can exhibit small unevenness as can arise, for example, as a result of production. The contact surface can also have roughening or corrugation of the surface so that a better frictional connection is achieved. The two planes are defined by the respective contact surface.

According to a preferred embodiment, the tabs touching each other rest flat against one another. This advantageously enhances manufacturing since the manufacturing process can be configured so that a flat surface of the raw material can be maintained.

According to a preferred embodiment, the flat surface is parallel to a rail contact surface, and the rail contact surface is designed to serve as a bearing surface for the rail foot.

The rail is held on the second clamp by one or more rail holders. The rail holders preferably grasp the rail foot and position the rail foot on the rail contact surface. In so doing, a clamping force can be exerted on the rail foot. However, the clamping force should preferably be selected to be so small that the rail can slip along the direction of travel.

The flat surface is preferably oriented parallel to the holding structure. This means that on the one hand, the flat surface is oriented parallel to the extension direction of the rail, and on the other hand, the flat surface forms a right angle to the two lateral guide surfaces of the rail.

According to a preferred embodiment, at least the two tabs of the first clamp or the two tabs of the second clamp each have an elongated hole, the orientation of which preferably has a directional component normal to the flat surface.

Advantageously, the two tabs of the first clamp each have an elongated hole. As a result, the second clamp along such elongated holes can be precisely adjusted to the correct distance from the wall to the rail. The tabs of the second clamp can thereby be configured to be shorter than the tabs of the first clamp.

According to a preferred embodiment, the second clamp can be placed on the first clamp in a stable manner.

After being placed on the first clamp, the second clamp is therefore in a stable position which cannot easily be changed even due to slight vibrations or unintentional contact.

In this case, the criterion of stability can be understood in accordance with the definition of mathematical stability theory. A small movement out of the placed position, as is caused for example by vibrations or unintentionally touching the second clamp, thereby remains small. In particular, the second clamp returns to the placed position. Energy must be expended to bring the second clamp out of the stable position. This energy must be applied by actively lifting out the second clamp. Without such additional energy, it remains in the stable position over the long term.

The angle $\alpha$ describes the angle between the tab and the lateral direction of the particular central part. The angle $\alpha$ always deviates positively or negatively from an angle of 90°. The advantage of an angle that deviates only slightly from 90° is that the second clamp rests very stably. The small angle leads to a slight clamping effect. In addition, the clamp would have to be lifted relatively high out of the stable position in order to be able to fall into the shaft. The advantage of an angle that deviates greatly from 90° is that the second clamp can be placed on the first clamp with a large tolerance. An imprecise and therefore rapid alignment is sufficient to place the second clamp on the first clamp. In addition, the second clamp cannot get jammed as much on the first clamp if the angle deviates sufficiently from 90°.

A preferred range for the angle $\alpha$ deviates by 5° from 90° to 60°. It is therefore between 30° and 85°, or between 95° and 150°. On the one hand, this ensures that the second clamp rests securely which reduces the risk of the second clamp being displaced from the stable position and falling down. On the other hand, the clamp still remains easily displaceable such that the distance between the wall and the rail can be adjusted easily. Angles $\alpha$ that deviate from 90° by 10° to 30° are particularly suitable. A particularly suitable region for the angle $\alpha$ is therefore between 60° and 80°, or between 100° and 120°.

According to a preferred embodiment, the second clamp has a recess that serves in particular for receiving a fastening element and thereby enables a closer position of the second clamp to the holding structure, wherein the fastening element serves for fastening the first clamp to the holding structure.

According to a preferred embodiment, the first clamp has a recess that serves in particular for receiving the rail holders and thereby enables a closer position of the second clamp in the holding structure.

In particular, the recesses of the first clamp serve to provide space for the screws of the rail holders in that the recesses receive them.

Advantageously, the recesses both in the first clamp and those in the second clamp serve to allow the central part of the second clamp to be pushed very tightly against the central part of the first clamp, by which a small minimum distance between the holding structure and the rail can be adjusted.

It is also possible to further reduce the distance between the second clamp and the supporting structure by depressions in the holding structure under the recesses of the first clamp. The minimum distance between the rail foot and the holding structure can thereby be optimally determined only by the material thickness of the two central parts.

According to a preferred embodiment, a first distance between the tabs of the first clamp and a second distance between the tabs of the second clamp are selected such that, when the second clamp is placed on the first clamp, a connecting screw can easily be inserted into the elongated hole.

As a result of the advantageous choice of the two distances, the second clamp is lowered exactly as far as possible over or into the first clamp when it is placed on the first clamp, such that one elongated hole is brought into alignment with a further elongated hole or a round hole. As a result, the connecting screw can be inserted easily.

Preferably, the first central part and the second central part are also arranged at the same height in the shaft.

According to a preferred embodiment, the first clamp and/or the second clamp is formed from a metal blank, in particular a piece of sheet metal, by means of bending.

According to a preferred embodiment, the metal blank is manufactured by means of punching.

The two clamps are preferably punched out of sheet metal, wherein all fastening holes, elongated holes and contours can be made in one operation. The tabs are then created by bending a part of the sheet metal. Advantageously, the angle $\alpha$ deviates only slightly from 90°. As a result, the punched blank is a substantially straight metal sheet, and can be produced with little waste.

Since the central part, in particular the second central part, is configured as a flat surface and advantageously also the tabs are configured as flat surfaces, the production of the second clamp is particularly easy by means of a bending process. The first clamp is preferably produced by means of a similar process.

According to a preferred embodiment, the rail of the rail system is aligned in a straight line, and the depth of each individual rail fastening system can be adapted to a distance between the holding structure and the rail, in particular by turning the second clamp.

The depth of the rail fastening system therefore substantially designates the distance between the central part of the first clamp and the central part of the second clamp. This distance can be adjusted with this fastening device, in particular by turning the second clamp and displacing the second clamp relative to the first, such that the locally required distance between the holding structure and the rail can be adapted.

As a result, it is possible to align the rail vertically and straight on a holding structure, the vertical course of which can vary greatly.

According to a preferred embodiment, the second clamp has one or more rail holders that serve for fastening the rail to the second clamp.

Preferably, the rail holders are already pre-mounted on the second clamp. It is possible to pre-mount the rail holders on the second clamp in two ways. Preferably, some of the second clamps are prepared for the first configuration and the others are prepared for the second configuration. The second clamps prepared in this manner differ by the orientation with which the rail holders are pre-mounted on the second clamp. Upon assembly, the fitter can, as required, insert the second clamp, which has pre-mounted the rail holders in the correct orientation.

The rail holders are preferably mounted so as to be displaceable along the second central part such that the rail can be displaced along the flat surface and thereby aligned when the rail holders are not yet fixed. The rail holder can then be fixed in place, preferably by tightening at least one screw of the rail holder. This means that the local position of the rail can be adjusted in a first horizontal direction by displacing the second clamp relative to the first clamp in a direction at a right angle to the flat surface. In a second horizontal direction, the local position of the rail can be adjusted by displacing the rail holder along the lateral direction of the second clamp.

The method for fastening a rail of an elevator system has the advantage that it enables easy and rapid installation. First, only the first clamp is fastened to the holding structure. Typically, for example, holes are initially drilled in a shaft wall, which are then provided with anchor bolts. The first clamp can then be easily fastened to this anchor bolt, for example, with a nut. A first advantage is therefore that the first clamp can be held comfortably with one hand, while the second hand puts in the screw.

Subsequently, the second clamp can be easily placed on the first clamp. Due to the special shape, the latter easily remains on the first clamp. The second clamp rests on the first clamp in a stable manner, and allows the fitter to release the second clamp. Therefore, the fitter has both hands free for other activities such as, for example, the attachment and alignment of the rail, or the insertion of the connecting screws.

A rail element, which forms a part of the rail at this location, can now be brought into position. It can attach and connect a rail section to the previously attached part of the rail. Then, the fitter can align the rail section in such a manner that, together with the previously attached part of the rail, a straight rail results. As soon as the rail section is correctly positioned, and the rail is oriented straight and preferably vertically, the second clamp with the rail fastenings can preferably be fastened only loosely to the rail. In addition, the second clamp can be lifted off the first clamp in order in order to fasten the rail foot more easily.

Subsequently, the second clamp rests again on the first clamp. Due to the special shape, the second clamp is aligned on the first clamp such that the fitter can easily attach the connecting screws to connect the two clamps because the fastening holes and the elongated holes of the tabs are aligned with one another. Before the screws are tightened firmly, the distance of the rail from the wall can be adjusted.

According to a preferred embodiment, the method for fastening a rail further comprises selecting a first or second configuration by placing the second clamp on the first clamp in a first orientation or in a second orientation rotated by 180° from the first orientation.

For this purpose, the second clamp is preferably rotated by 180° relative to the first clamp about a vertical axis. As a result, the central part of the second clamp is oriented horizontally with both orientations. The rail holders fastened to the second clamp are therefore each oriented such that the rail foot of the rail can be optimally gripped.

It is therefore advantageous that the two tabs of the second clamp and preferably also the two tabs of the first clamp have the same angle $\alpha$ to the lateral direction of the central parts.

According to a preferred embodiment, the method for fastening a rail further comprises displacing the second clamp relative to the flat surface.

The rail can therefore easily be displaced in the two directions perpendicular to the extension direction and can therefore be oriented in a vertical manner. As mentioned above, the rail holders can be mounted displaceably along the second central part. The displacement and therefore the vertical orientation in the second direction, which is preferably perpendicular to the first direction, takes place by means of the displacement perpendicular to the flat surface. Such displacement is preferably enabled by elongated holes.

Further advantages, features and details of the invention can be found in the following description of embodiments and with reference to the drawings, in which like or functionally like elements are provided with identical reference signs. The drawings are merely schematic and are not to scale.

DETAILED DESCRIPTION

Figure 1:
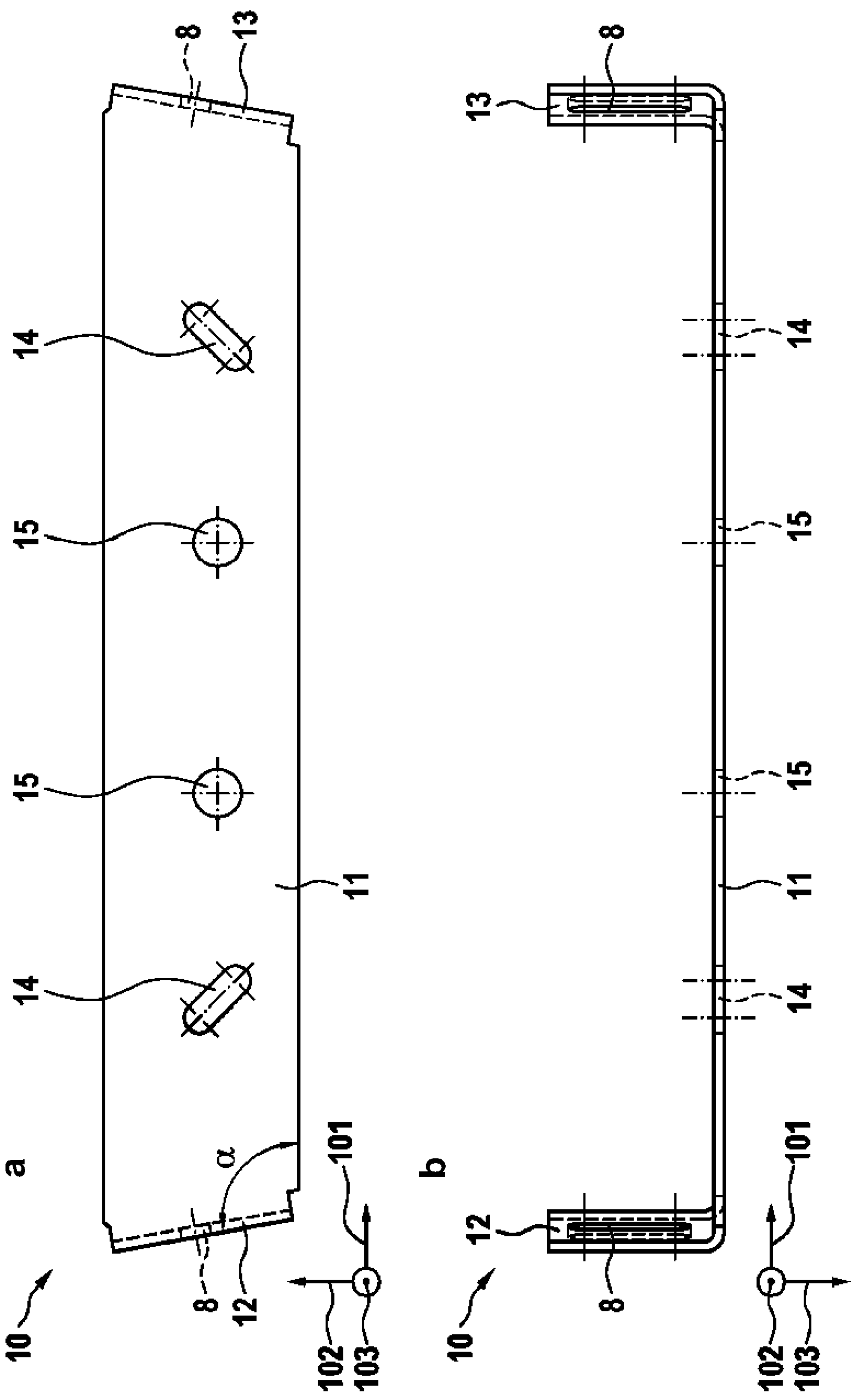
FIG. 1 shows a first clamp of a rail fastening system in a front view “a” and a view “b” from above.

FIG. 1 shows a first clamp 10 of a rail fastening system in a view from the front (top view) and in a view from above (bottom view). The first central part 11 is formed significantly longer in the lateral direction 101 than in the width direction 102. The central part 11 of the first clamp 10 has wall fastening holes 14 and recesses 15. The wall fastening holes 14 serve for fastening the first central part 11 of the first clamp 10 to the holding structure. For this purpose, retaining bolts and nuts, which are not shown in any of the figures, are advantageously used.

The first tab 12 and the second tab 13 of the first clamp 10 are located at the two ends of the first central part 11 and extend from the first central part 11 in the depth direction 103. Both tabs 12, 13 each have an elongated hole 8. The first central part 11 and the two tabs 12, 13 are bent from a piece of sheet metal. The two bending edges run relative to the lateral direction 101 of the first central part 11 at an angle α of 100°.

Figure 2:
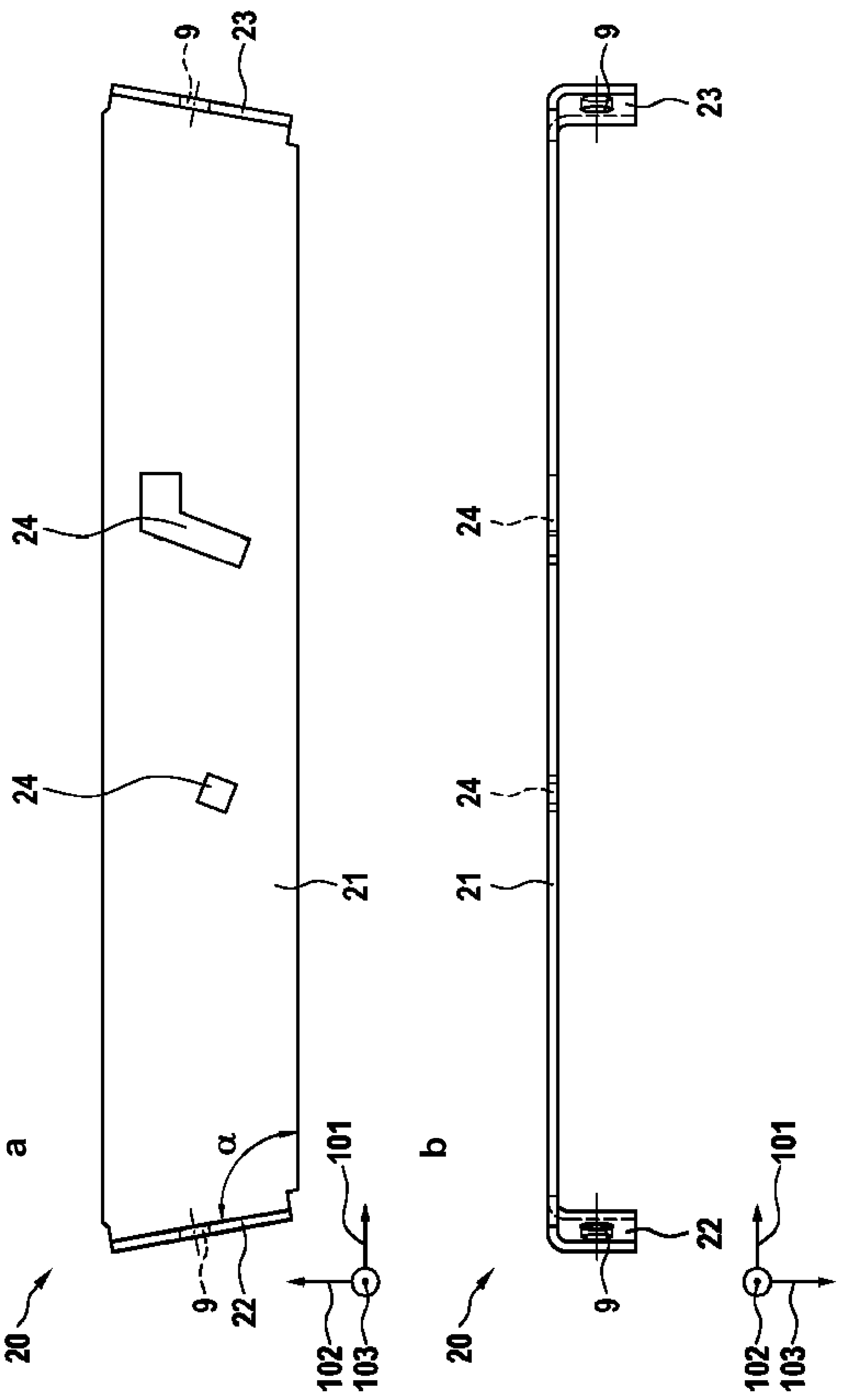
FIG. 2 shows a second clamp of a rail fastening system in a front view “a” and a view “b” from above.

FIG. 2 shows the second clamp 20 of a rail fastening system matching the first clamp 10 from FIG. 1. The views are the same as in FIG. 1. The second central part 21 is also formed significantly longer in the lateral direction 101 than in the width direction 102. The length of the second central part 21 is substantially the same as the length of the first central part 11. It deviates only by approximately two sheet metal thicknesses from the length of the first central part 11. The central part of the second clamp 21 has openings 24 for the rail holders on which the rail holders are fastened to the second clamp 20.

A first and a second tab 22, 23 are also on the second central part 21 at its ends and extend from the second central part 21 in the depth direction 103. These two tabs 22, 23 each have a round hole 9. The round hole 9 requires less space than an elongated hole 8, and therefore the tabs 22, 23 of the second clamp 20 can be configured to be shorter than the tabs 12, 13 of the first clamp 10.

Figure 3:
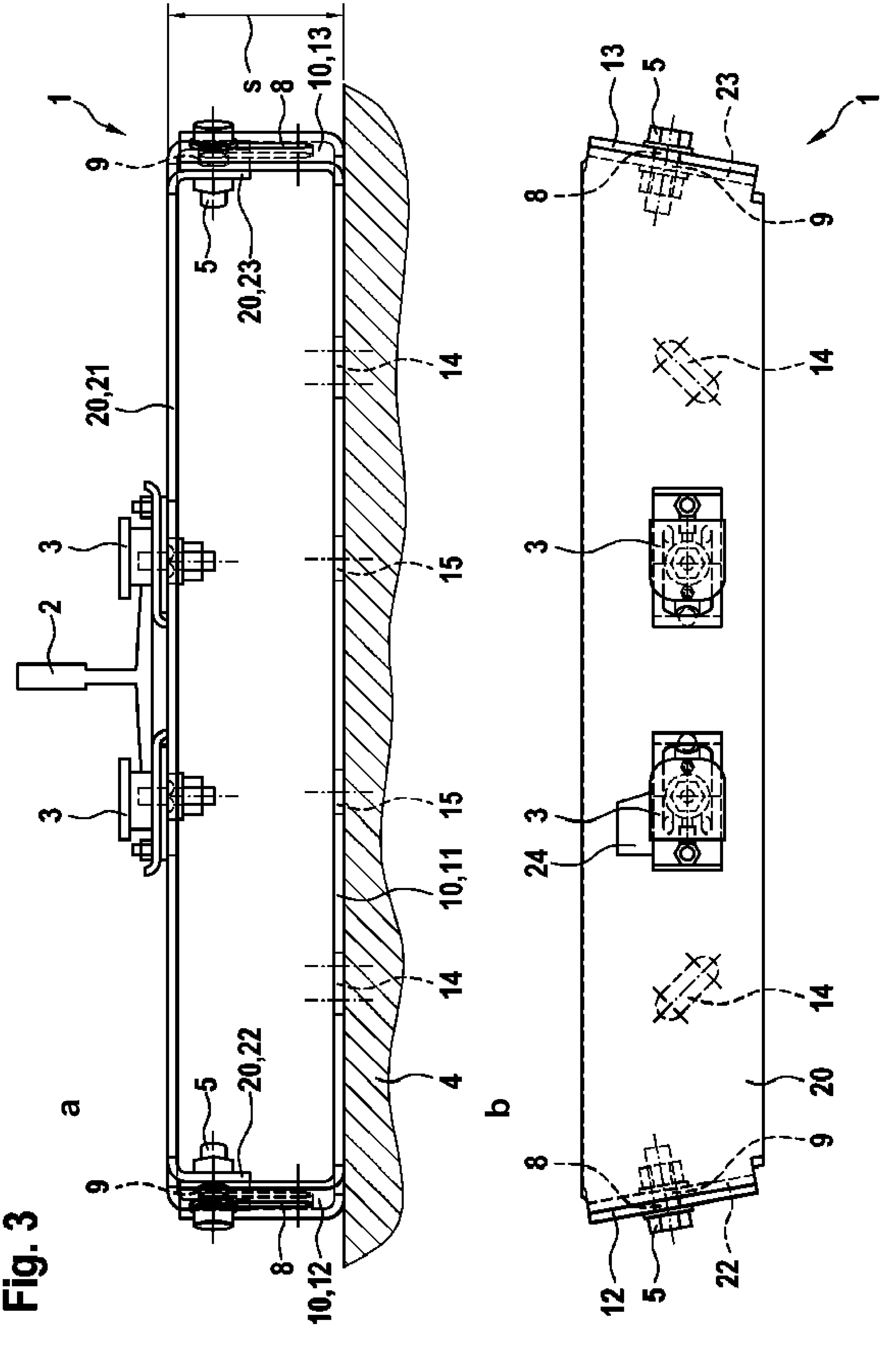
FIG. 3 shows a rail fastening system in a first configuration in a plan view “a” and a front view “b”
Figure 4:
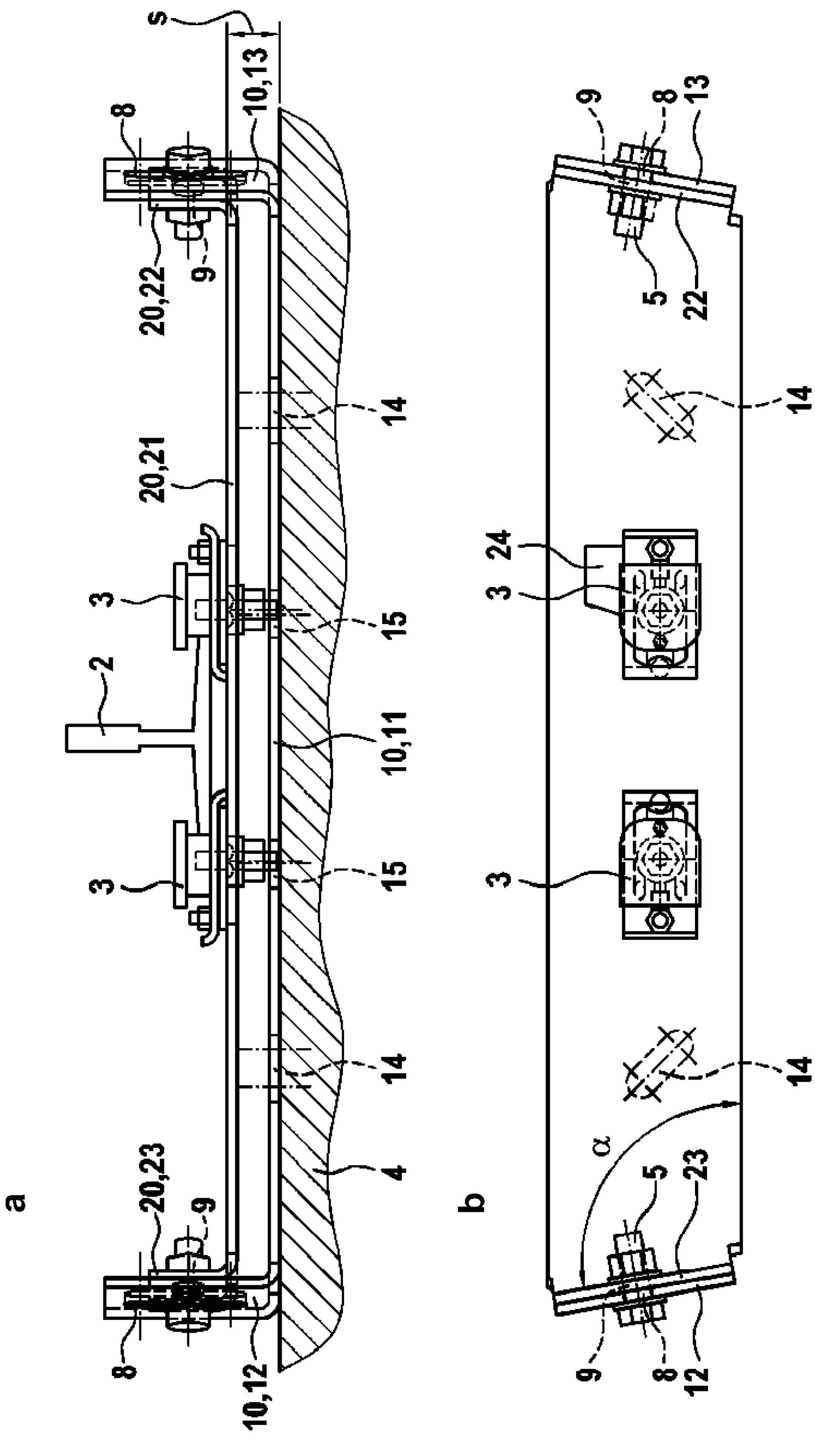
FIG. 4 shows the rail fastening system in a second configuration in a plan view “a” and a front view “b”

FIG. 3 and FIG. 4 show the first and the second configuration, in which the two clamps from FIGS. 1 and 2 can be combined to form a rail fastening system 1. The plan view is shown at the top, and a front view at the bottom. In the plan view, the rail 2 and the rail holder 3 are also shown, whereas the front view shows only the rail holder 3. The two figures also show how the first clamp 10 rests with its central part 11 against the holding structure 4. The first clamp 10 can be fastened to the holding structure 4 by means of the wall fastening holes 14.

The tabs 12, 13 of the first clamp 10 are each connected to the tabs 22, 23 of the second clamp 20 by means of screws 5. Each of the screws 5 runs through an elongated hole 8 and a round hole 9. In FIG. 3, the first tab 12 of the first clamp 10 is connected to the first tab 22 of the second clamp 20. For the second configuration in FIG. 4, the second clamp is rotated by 180° about a vertical axis, i.e. parallel to the course of the rail 2. As a result, the second tab 23 of the second clamp 20 is now located at the first tab 12 of the first clamp 10. The selection of the orientation can be made when the second clamp 20 is placed on the first clamp 10 and depends on how large the distance s between the holding structure 4 and the rail 2 must be.

FIG. 3 shows the rail fastening system 1 with the maximum adjustable distance s. The screw connection 5 is in the outermost possible position of the elongated hole 8. In this configuration, the recesses 15 remain free. FIG. 4 shows the rail fastening system 1 with the minimum adjustable distance s. Such minimum distance s is predetermined by the employed rail holders 3, and in particular the screws of the rail holder 3. The recesses 15 allow the distance s to still be smaller than a sheet metal thickness than would be the case without the recesses 15. It would be possible to continue the recesses 15 as depressions (not shown) in the holding structure 4 and thereby further reduce the minimum distance s.

Figure 5:
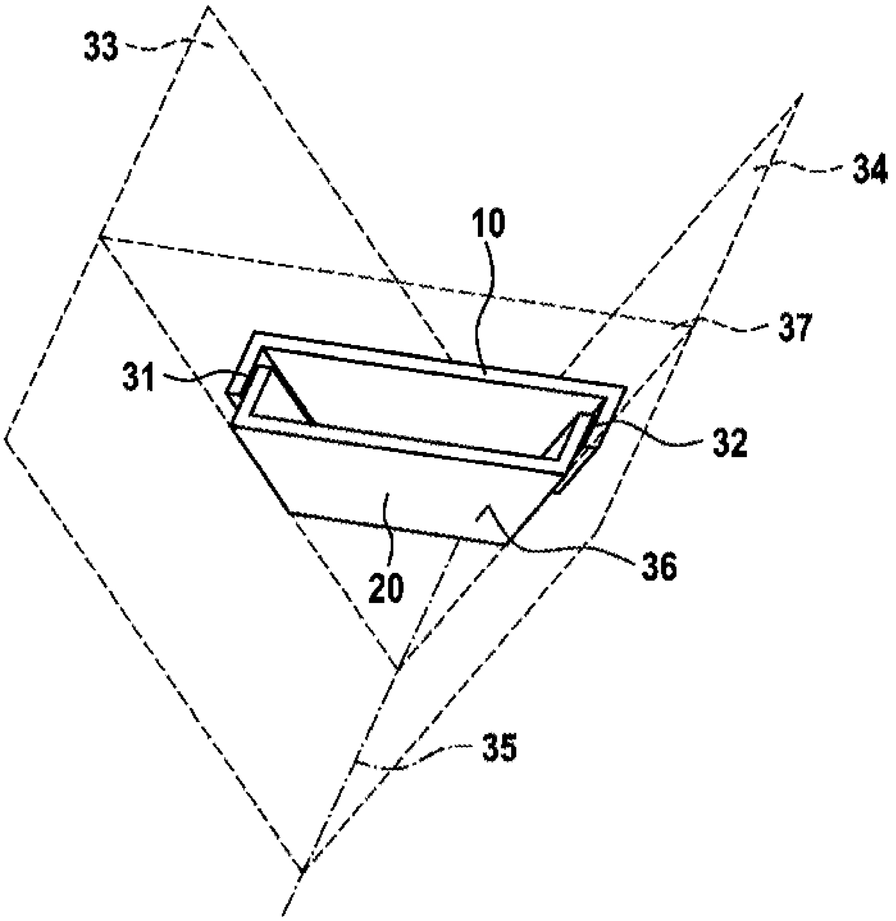
FIG. 5 shows the first plane and the second plane.

FIG. 5 shows a first plane 33 and a second plane 34 as are defined by the contact surfaces 31, 32 of the tabs 12, 13, 22, 23. The tabs 12, 13, 22, 23 are planar sheet metal parts, and therefore their likewise planar contact surfaces define the respective planes. The first plane 33 and the second plane 34 intersect in an intersecting line 35. A flat surface 37 is defined by a rail contact surface 36. The rail contact surface is formed on the central part 21 of the second clamp 20. The rail 2, and in particular the rail foot of the rail 2, rests on this planar rail contact surface 36. Therefore, the flat surface 37 is parallel to the rail 2 and, since the rail is preferably oriented vertically, is preferably also oriented vertically.

Figure 6:
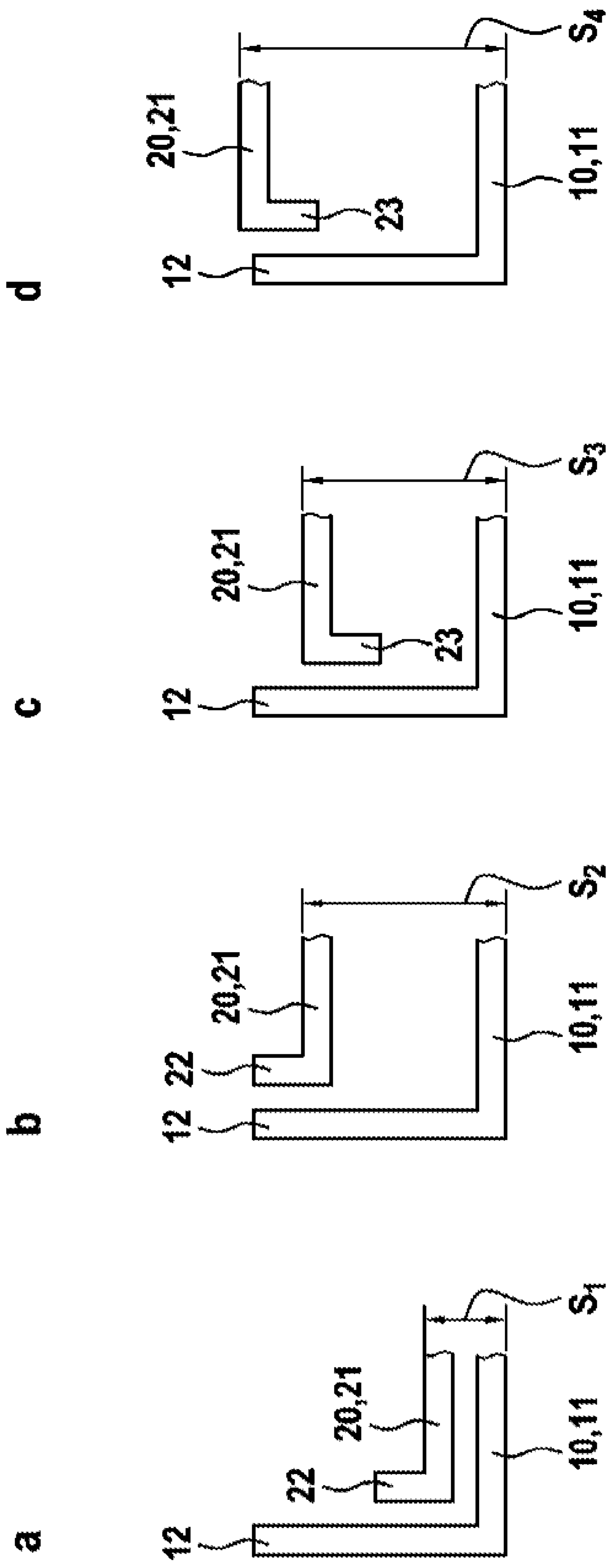
FIG. 6 shows the adjustment of the distance between the holding structure and the rail.

FIG. 6 shows a projection in the direction of the intersection axis between the first plane 33 and the flat surface 37. FIG. 6 view "a" shows the minimum adjustable distance $S_1$. By displacing the second clamp 20 relative to the first clamp 10 along the elongated hole, a mean distance $S_2$ (view "b") can be adjusted which is at least equal to the minimum distance $S_3$ (view "c") in the second configuration in which the second clamp 20 is turned by 180°. By being displaced along the elongated hole, a distance to the maximum distance $S_4$ (view "d") of the rail fastening system 1 can be adjusted.

Figure 7:
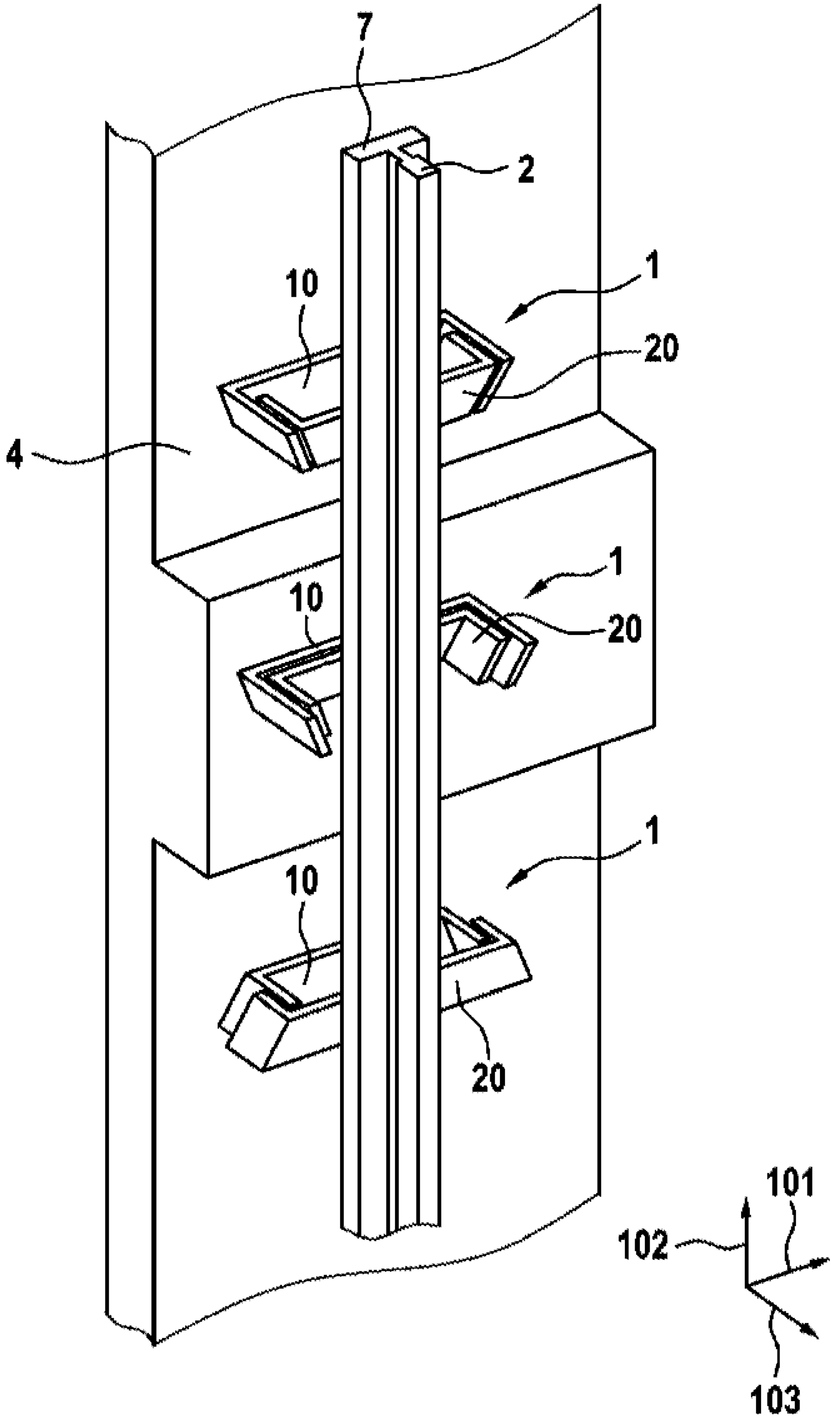
FIG. 7 shows three rail fastening systems that hold a rail on a holding structure.

FIG. 7 shows a holding structure 4 that deviates from a vertical orientation. The schematic and idealized representation with the steps makes it possible to clearly show the positional variation of the holding structure, but does not necessarily correspond to the situation in an elevator system. Alternative holding structures 4 can also comprise uneven surfaces as arise, for example, due to tolerances upon construction. Metallic holding structures or framework structures can have individual surfaces that have locally different distances to the target position of the rail, and can therefore correspond to the steps of FIG. 7.

FIG. 7 shows two design variants of the rail fastening system 1. The upper two rail fastening systems 1 correspond to the embodiment as already shown in FIGS. 1 to 4. In the assembled state, the tabs 22, 23 of the second clamp 20 are located between the tabs 12, 13 of the first clamp 10. The shown angle α is 135°, i.e. 45° deviating from the vertical. In the first embodiment, the angle α is at least larger enough for the second clamp 20 can rest on the first clamp 10.

The upper system of the three rail fastening systems 1 shows a wide configuration of the first embodiment, i.e., one that is suitable for large distances between the holding structure 4 and the rail 2. In this configuration, a distance can be adjusted via a relative displacement between the first clamp 10 and the second clamp 20 along the elongated holes such that the rail 2 runs straight. The middle of the rail fastening systems 1 shows the configuration of the first embodiment suitable for shorter distances that is obtained by turning the second clamp 20. In this case as well, a distance analogous to the first configuration can be adapted.

The lower of the three rail fastening systems 1 shows an alternative embodiment with which the tabs 22, 23 of the second clamp 20 touch the tabs 12, 13 of the first clamp 10 from the outside. The angle α is now 45°, i.e. again 45°, deviating from the vertical 102. The angle now deviates from the vertical 102 in the other direction so that the second clamp 20 again rests on the first clamp 10. By turning the second clamp, a configuration suitable for shorter distances can in turn be obtained. Contrary to the shown example, the first and the second embodiment would not be used together in the same elevator. By using only a single embodiment in an elevator system, it can be ensured that each first clamp can be combined with each second clamp.

Finally, it should be noted that terms such as "comprising," "having," etc. do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A rail fastening system for fastening a rail of a vertically movable car of an elevator system, the rail fastening system comprising:

a first clamp adapted to be connected to a holding structure of the elevator system and a second clamp adapted to be connected to the rail of the elevator system;

wherein the first clamp has a laterally extending first central part connectable to the holding structure, and the second clamp has a laterally extending second central part connectable to the rail;

wherein each of the first clamp and the second clamp has a first tab and a second tab attached in a lateral direction at opposite ends of the respective first central part and the second central part enabling the first clamp and the second clamp to be assembled together in a first configuration and an alternative second configuration;

wherein, when assembled in the first configuration, the first tab of the first clamp is connected to the first tab of the second clamp on a first contact surface, and the second tab of the first clamp is connected to the second tab of the second clamp on a second contact surface;

wherein, when assembled in the second configuration, the first tab of the first clamp is connected to the second tab of the second clamp on the first contact surface, and the second tab of the first clamp is connected to the first tab of the second clamp on the second contact surface; and wherein a first plane that runs parallel through the first contact surface and a second plane that runs parallel through the second contact surface intersect in an intersecting line, and the intersecting line is perpendicular to a flat surface that extends parallel to a surface of the second central part.

2. The rail fastening system according to claim 1 wherein the connected tabs rest flat against one another.

3. The rail fastening system according to claim 1 wherein the flat surface is parallel to a rail contact surface of the rail, and the rail contact surface is adapted to be a bearing surface to a rail foot of the rail.

4. The rail fastening system according to claim 3 wherein the first tab and the second tab of the first clamp, or the first tab and the second tab of the second clamp, each have an elongated hole extending normal to the flat surface.

5. The rail fastening system according to claim 1 wherein when the first clamp is connected to the holding structure and the second clamp is placed on the first clamp, the second clamp rests securely on the first tab and the second tab of the first clamp.

6. The rail fastening system according to claim 1 wherein the first clamp has a recess adapted to receive a rail holder thereby enabling the second clamp to be positioned closer to the holding structure.

7. The rail fastening system according to claim 1 wherein the first clamp has a recess that receives a rail holder thereby enabling the second clamp to be positioned closer to the holding structure.

8. The rail fastening system according to claim 1 wherein a first distance between the first and second tabs of the first clamp and a second distance between the first and second tabs of the second clamp are predetermined such that when the second clamp is placed on the first clamp, either the second clamp fits between the tabs of the first clamp or the first clamp fits between the tabs of the second clamp.

9. The rail fastening system according to claim 1 wherein at least one of the first clamp and the second clamp is formed from a metal blank by bending.

10. The rail fastening system according to claim 9 wherein the metal blank is a piece of sheet metal.

11. The rail fastening system according to claim 9 wherein the metal blank is manufactured by punching.

12. A rail system for an elevator system comprising:

at least one of the rail fastening system according to claim 1; and a rail for guiding a car of the elevator system and fastened by the at least one rail fastening system.

13. The rail system according to claim 12 wherein the rail is aligned in a straight line and fastened by a plurality of the at least one rail fastening system, and wherein a depth of each of the rail fastening systems is adapted to a distance between the holding structure and the rail by turning the second clamp.

14. The rail system according to claim 12 wherein each of the second clamps has a rail fastening that fastens the rail to the second clamp.

15. A method for fastening a rail of an elevator system, the method comprising the steps of:

fastening the first clamp of the rail fastening system according to claim 1 to a holding structure of the rail system;

placing the second clamp of the rail fastening system onto the first clamp;

fastening the rail to the second clamp; and fastening the first clamp to the second clamp.

16. The method according to claim 15 further comprising:

selecting one of a first configuration and a second configuration of the rail fastening system by placing the second clamp on the first clamp in a first orientation or in an orientation rotated by 180° to the first orientation; and displacing the second clamp relative to the flat surface.

* * * * *